United States Patent [19]
Lohstroh

[11] 4,081,793
[45] Mar. 28, 1978

[54] DEVICE FOR READING OUT THE CHARGE CONDITION OF A PHOTOTRANSISTOR

[75] Inventor: Jan Lohstroh, Eindhoven, Netherlands

[73] Assignee: U.S. Philips Corporation, New York, N.Y.

[21] Appl. No.: 639,359

[22] Filed: Dec. 10, 1975

[30] Foreign Application Priority Data

Dec. 16, 1974 Netherlands ............... 7416330

[51] Int. Cl.$^2$ ............................................. H04Q 3/00
[52] U.S. Cl. ........................... 340/166 R; 307/311; 340/166 EL
[58] Field of Search ............ 340/166 R, 166 EL; 307/311, 23 ST

[56] References Cited

U.S. PATENT DOCUMENTS

| | | | |
|---|---|---|---|
| 3,735,151 | 5/1973 | Frederiksen | 307/235 T |
| 3,797,894 | 3/1974 | Carp | 307/235 T |
| 3,798,559 | 3/1974 | Tomita | 307/235 T |
| 3,872,329 | 3/1975 | Dodson | 307/311 |
| 3,911,268 | 10/1975 | Mori | 307/311 |
| 4,004,158 | 1/1977 | Morgan | 307/235 T |

*Primary Examiner*—Harold I. Pitts
*Attorney, Agent, or Firm*—Frank R. Trifari

[57] ABSTRACT

A device for reading out the charge condition of a phototransistor by means of sampling pulses, for example read out of a transistor to be selected from a matrix of phototransistors, a voltage which is a measure of said charge condition being taken from the emitter of the phototransistor. In order to avoid the storage effect owing to the time constant which depends on the differential resistance of the base-emitter-junction, the emitter circuit of the phototransistor includes a current source which at the instant of sampling is switched on, while furthermore the emitter voltage of the phototransistor is applied to a voltage comparator circuit which supplies a voltage for switching off the current source at the instant that said emitter voltage drops below a specified reference value. In the case of read-out after a dark period some charge is drained owing to the response time of electronic systems, which charge can be compensated for by simple injection means.

10 Claims, 10 Drawing Figures

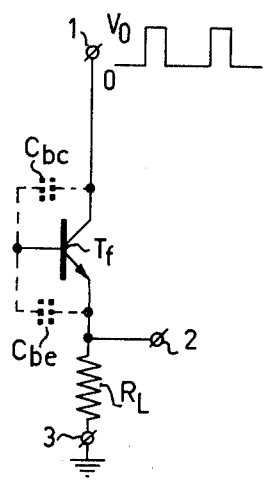
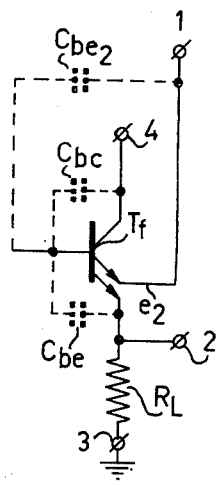
Fig.1    Fig.2
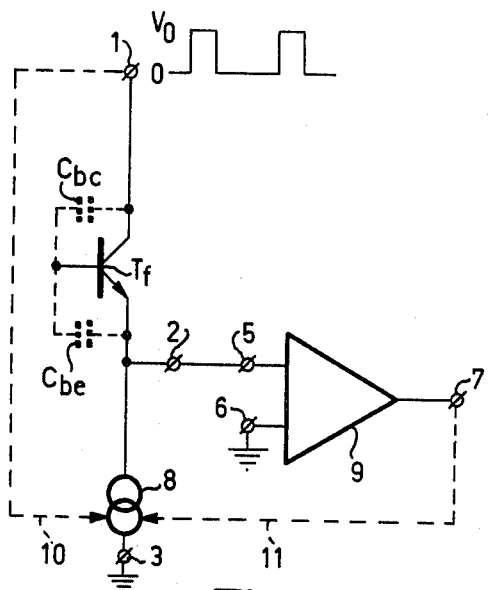
Fig.3

DEVICE FOR READING OUT THE CHARGE CONDITION OF A PHOTOTRANSISTOR

BACKGROUND OF THE INVENTION

The invention relates to a device for reading out the charge condition of a phototransistor by means of sampling pulses as an example, read-out of a transistor to be selected from a matrix of phototransistors is sampled by the sampling pulses, and a voltage which is a measure of the charge condition is taken from the emitter of the phototrasnsistor.

Such a device is known from "I.E.E.E. Transactions on Electron Devices", Vol. ED-15, No. 4, April 1968, pages 226 – 237. In this device a sampling voltage pulse is applied to the collector of the phototransistor to be read out and a signal is taken from the emitter across a load resistor. At the instant that the sampling pulse appears, this signal exhibits a switching transient of substantially the same height as the sampling pulse. Subsequently, the voltage across the resistor decreases with a time constant which is mainly determined by the value of the load resistor and the capacitance of the cut-off base-emitter junction. At the instant that the base-emitter junction is turned on, the transistor discharges with a time constant which is mainly determined by the capacitance of the (reverse biased) base collector junction and the sum of the values of the load resistor and the differential resistance of the base-emitter junction. The instant at which the base-emitter junction is turned on, which is apparent from the changed time constant, is determined by the charge which is generated in the transistor by the incident light.

Drawbacks of the prior-art device are that the differential resistance of the base-emitter junction, and thus the discharge time constant, increases substantially as the transistor is further discharged. This last-mentioned phenomenon results in a storage effect because the transistor, especially in case of very short sampling pulses, is not discharged sufficiently. As a result of this, the transistor is further discharged upon a subsequent sampling pulse, even if no charge is produced in the intermediate period owing to a dark period.

SUMMARY OF THE INVENTION

It is an object of the invention to mitigate the foregoing drawbacks.

To this end, the invention is therefore characterized in that the emitter circuit of the phototransistor includes a current source, which is switched on at the instant of sampling. The emitter voltage of the phototransistor is applied to a voltage comparator circuit which supplies a voltage for switching off the current source at the instant that the emitter voltage drops below a prescribed reference value.

The invention is based on the recognition that if the phototransistor is discharged with a constant current the time constants of the device have no influence on the discharge process. If the discharge current is sufficiently large, the transistor can be fully discharged within the sampling period.

In this respect it is to be noted that from "I.E.E.E. Journal of Solid-State Circuit", June 1971, pages 135 – 136 a device is known in which the sampling pulses are applied to an auxiliary emitter. The base-emitter junction associated with said auxiliary emitter is then always reverse biased, so that the auxiliary emitter-base junction constitutes a capacitance which fulfils the same function as the base-collector capacitance in devices in which the sampling pulses are applied to the collector. It is obvious that the invention is also applicable to such a device.

Although by the use of a read-out method in accordance with the invention the storage effect is eliminated, a different storage effect appears, though to a smaller extent, particularly after dark periods. If no charge is present in the transistor, the current source must be switched off again at the very instant that it is switched on. Since electronic systems always have a certain delay, a minimal amount of charge drained from the transistor cannot be avoided. As more dark periods follow each other, the transistor will be discharged further and further. During the next light period a part of the generated charge will replenish the deficiency thus produced, so that the next value which is read out will be too small. This storage effect is in fact opposite to the known storage effect, because in the device according to the invention the excess charge is drained, whereas in the prior-art device too little charge is drained. Moreover, the excess charge which is drained is independent of the amount of charge generated during a previous light period.

In a device according to the invention, this storage effect may be eliminated in a simple manner in that the charge drained from the phototransistor by the current source during a dark period of the phototransistor during sampling is compensated for by charge injection means in the base of the phototransistor.

These charge injections means may very simply be constituted, as for example, by a background illumination, both continuously and intermittently. This is not possible with the prior art device because in that case the storage effect is obtained by a charge surplus.

In some cases such a background illumination may present problems with respect to the additional illumination means which are required and control of the luminous intensity. Therefore, it is advantageous, in particular in integrated circuits, that the charge injection means comprise a transistor. This transistor is of a conductivity type opposite to the conductivity type of the phototransistor, and has its drain electrode connected to the base of the phototransistor and an injection-controlling voltage being applied between the control electrode and the source electrode of said transistor.

A particularly well-defined amount of charge is injected if the injection-controlling voltage is taken off via a semiconductor junction which, in series with a capacitive element, is included between two points between which a pulsating voltage is available. The source electrode of the transistor is connected to the connection point between the capacitive element and the one side of the semiconductor junction and the control electrode is connected to the other side of the semiconductor junction. The forward direction of the semiconductor junction is connected opposite to the forward direction of the control-electrode -source-electrode junction of the transistor.

Since the sampling pulses are already available in the device, it is advantageous that one of the two points is connected to a point of constant potential and the other of the two points is connected to a point at which the sampling pulses appear.

In this respect there are two possibilities of including the series connection of the capacitive element and the semiconductor junction between the point of constant potential and the point at which the sampling pulses are available. In the one case injection takes place during the occurrence of the sampling pulse and in the other case in the absence of the sampling pulse.

In devices in accordance with the invention which are combined with a matrix of phototransistors, the charge condition of one of the phototransistors of the matrix being sampled with the aid of selection means, it is advantageous that the current source and the voltage comparator circuit are in common for all phototransistors in one row of the matrix.

Injection controlled by the sampling pulses may have the drawback that the amount of charge which is injected is determined by the sampling pulse.

Particularly in devices in accordance with the invention, combined with a matrix of phototransistors, in which each phototransistor is provided with a charge injection circuit, the sampling pulses are applied to a second emitter of each phototransistor, and in each column of the matrix the second emitters are connected to a column selection means via a common connection line. In each row of the matrix the emitters from which the output voltage is taken are connected to a row selection means via a common connection line. It is therefore advantageous that the collectors of all phototransistors of the matrix are constituted by a common semiconductor layer, that the control electrodes of the transistors of the injection circuits are connected to the collectors of the phototransistors, and that the pulsating voltage between said points are voltage pulses which in the absence of sampling pulses are applied to said semiconductor layer.

This injection method has the advantage that injection is effected simultaneously for all phototransistors, the amount of charge injected being optionally variable without affecting the sampling pulses.

In all previous forms of devices in accordance with the invention the current source and the voltage comparator circuit may be combined, in that the current source together with the voltage comparator circuit is constituted by a bistable trigger circuit with a set input, a reset input and a current output, the current output being connected to the emitter of the phototransistor, starting pulses being applied to the set input in synchronism with the sampling pulses, and the reset input being connected to the emitter of the phototransistor.

In devices in accordance with the invention, combined with a matrix of phototransistors, the problem may arise that owing to the parasitic capacitance of a selected row, which parasitic capacitance is in parallel with the current source, discharge of the selected phototransistor is continued for some time until the base-emitter junction of the selected phototransistor becomes reverse biased. Although this excess discharge can be compensated by the injection circuit in accordance with the invention, it is more advantageous that the device comprises means for applying a voltage pulse to the emitter of the selected phototransistor when the current source is switched off. As a result, the base-emitter junction of the selected phototransistor is reverse biased at the instant that the current source is switched off.

Another step to solve the problem is characterized in that to each phototransistor a transistor of the same conductivity type is added, the base thereof being connected to the emitter of the phototransistor, the current source being included in the emitter circuit of the added transistor.

This step is based on the recognition that owing to the amplification of the read-out current by the current gain factor of the additional transistor, the excess charge drain is reduced by a factor $\beta$. Apparently, the capacitance of the collector-base junction of the phototransistor is increased by the current gain factor, so that the influence of said parasitic row capacitance is substantially reduced, which is also advantageous during the read-out process.

The invention will be described in more detail with reference to the drawing, in which

BRIEF DESCRIPTION OF THE DRAWINGS

FIGS. 1 and 2 each show a prior-art device for reading out the charge condition of a phototransistor, FIG. 3 schematically shows a device in accordance with the invention.

DETAILED DESCRIPTION OF THE INVENTION

Figure 4:
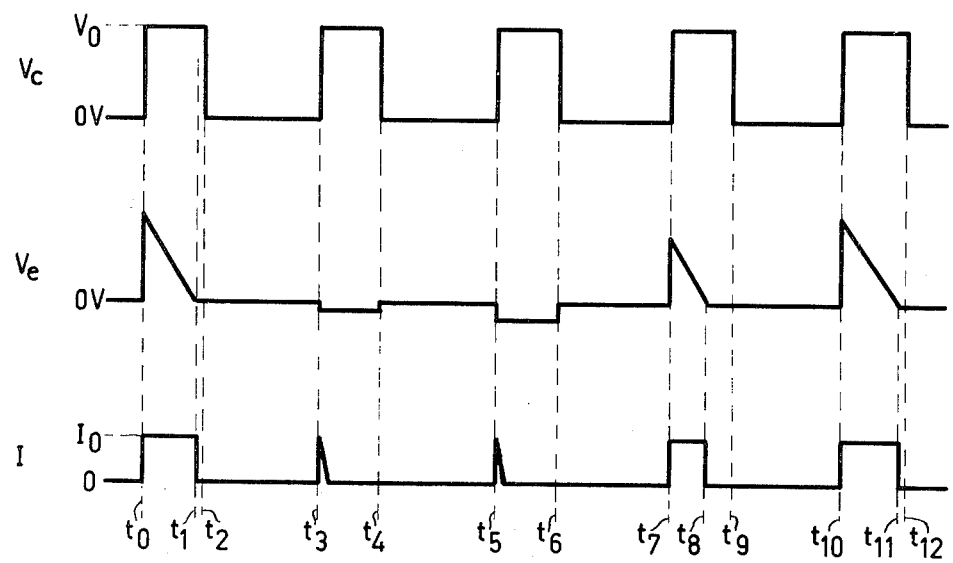
FIG. 4 shows some signal waveforms associated with the device of FIG. 3.

FIG. 1 shows a prior-art device for reading out the charge condition of a phototransistor. The collector of the phototransistor $T_f$ is connected to a point 1, to which sampling pulses are applied, and the emitter is connected to an output terminal 2 and via a load resistor $R_L$ to a point 3 of constant potential, in the present example earth potential.

When the base-emitter junction of the phototransistor $T_f$ is reversed biased, a parasitic capacitance $C_{be}$ exists between the base and the emitter, which in the Figure is shown dotted, as well as the parasitic base-collector capacitance $C_{bc}$.

In the absence of a sampling pulse the collector of the phototransistor $T_f$ is at a low potential, in the present example earth potential, and the base-emitter junction of phototransistor $T_f$ is cut off. If subsequently photons are incident, they generate a charge which causes the charge on the parasitic capacitances $C_{be}$ and $C_{bc}$ to decrease. Upon the application of a sampling pulse to the collector of phototransistor $T_f$, the parasitic capacitance $C_{bc}$ is charged to ultimately substantially $V_o$ volts, $V_o$ being the instantaneous collector voltage. Since the charge on the capacitances $C_{be}$ and $C_{bc}$, which has decreased owing to the incident photons, is not sufficient for this, the phototransistor $T_f$ will be turned on to charge the capacitance $C_{bc}$ further via the differential resistance of the base-emitter junction of the phototransistor $T_f$ and the load resistor $R_L$. The amount of charge to be replenished is then a measure of the amount of incident photons in the previous period. The corresponding charging current is available at point 2 in the form of a voltage across the load resistor $R_L$. Apart from being determined by the current gain factor of the phototransistor, the time constant of this charging current is also determined by the differential resistance of the base-emitter junction of the phototransistor $T_f$. As the charging process proceeds the charging current decreases, which causes an increase of the differential resistance of the base-emitter junction of the phototransistor $T_f$, so that the time constant increases and charging is effected more and more slowly.

Especially during short sampling pulses this presents the problem that at the end of a sampling pulse not yet all the charge generated by the photons has been read out. During a subsequent sampling pulse this residual charge together with the newly generated charge will be present, so that the output voltage across the load resistor $R_L$ will be higher than it should have been owing to the newly generated charge. This means that there is a storage effect which is especially predominant when a sampling pulse appears after a dark period. Charging, which was discontinued at the end of the previous sampling pulse, will then be continued again and thus give rise to a signal.

Apart from the example of a prior-art device of FIG. 1, other devices are known for reading out the charge condition of the phototransistor, of which FIG. 2 gives an example.

In the example of FIG. 2 the collector of the phototransistor $T_f$ is connected to a point 4 of constant potential, from example 3 V. The phototransistor $T_f$ in this example is provided with a second emitter $e_2$, which is connected to the point 1 to which the sampling pulses are applied.

The sampling pulses are fed to the base of the phototransistor $T_f$ via a parasitic capacitance $C_{be_2}$ which is formed by the cut-off base-emitter junction associated with the second emitter $e_2$. As a result, the operation of the device of FIG. 2 is similar to the operation of the device of FIG. 1. The capacitance $C_{be_2}$ fulfils a similar function as the capacitance $C_{bc}$ in the device of FIG. 1.

For simplicity the device according to the invention will be described on the basis of the device of FIG. 1. It will now be evident that the invention may also be applied to other devices which operate in accordance with a similar principle, an example of which was given in FIG. 2.

FIG. 3 schematically shows the device according to the invention. The load resistor $R_L$ has been replaced by a current source 8, which is started by the sampling pulses, which is symbolically represented by the dashed line 10 in the Figure. The output terminal 2, i.e., the emitter terminal, is connected to an input 5 of a comparator circuit 9. The reference input 6 of the comparator circuit 9 is connected to a point at reference potential, in the present example earth potential. At the output 7 of the comparator circuit 9 a specific signal appears as soon as the potential at the input 5 equals the reference potential. This signal is assumed to switch off the current source 8, which in FIG. 3 is symbolically represented by the dashed line 11.

The device of FIG. 3 will be described in more detail with reference to FIG. 4, in which $V_c$ is the voltage at the collector of the phototransistor $T_f$, $V_e$ the voltage at the emitter of the phototransistor $T_f$, and I the current which is drained from the phototransistor by the currence source 8.

The voltage wave forms shown are not identical to the voltage waveforms as would be measured on a phototransistor $T_f$. Only those details which are relevant for the description of the operation of the device are shown schematically. As an example, the emitter voltage $V_e$ will increase comparatively strongly after a currence source 8 has been switched off owing to the base-emitter capacitance $C_{be}$ being charged, and will exhibit a negative transient at the instant that the sampling pulse is switched off because the voltage drop at the collector of the phototransistor $T_f$ will initially appear at the emitter of the phototransistor $T_f$ via the capacitances $C_{be}$ and $C_{bc}$. During these processes at the emitter of the phototransistor $T_f$ the phototransistor $T_f$ is reverse biased, so that the charge at the base of the phototransistor is not influenced thereby and these processes are irrelevant for the read-out process.

At the instant $t_o$ a sampling pulse will appear at the collector of phototransistor $T_f$, which sampling pulse simultaneously energizes the current source 8. This current source 8, which in the energized condition carries a current of $I_o$ amperes, drains a charge equal to $I_o$ Coulombs from the phototransistor $T_f$ per unit of time. The emitter voltage $V_e$ decreases linearly, if it is assumed that the capacitance $C_{bc}$ is linear, because the capacitance $C_{bc}$ is charged with a constant current $I_o$. Owing to the constant current the differential resistance of the base-emitter junction does not play a part in this. If the current $I_o$ is so large within the duration of the sampling pulse the maximum charge that can be generated by incident light can be read out, this emitter voltage $V_e$ will have dropped to the reference level, in the present example earth potential, within the duration of the sampling pulse. At that instant $t_1$ the comparator circuit 9 responds and switches off the current source. The duration of the current pulse as well as the amplitude of the emitter voltage pulse are then a measure of the amount of light-generated charge during the previous period.

At the instant $t_2$ the sampling pulse is switched off. When it is assumed that there is no light incidence in the next period, the emitter voltage will directly equal to the reference level when the phototransistor $T_f$ is turned on upon the occurrence of the next sampling pulse at the instant $t_3$, so that the current source 8, which was switched on upon the occurrence of the sampling pulse, is immediately switched off again by the comparator circuit 9. Owing to the inevitable slowness of electronic systems the current source 8 will yet be energized very briefly, which results in some charge being drained. As a result, the emitter voltage $V_e$ decreases below the reference level.

It the next period is dark again, some charge will be drained again upon the occurrence of the sampling pulse at instant $t_5$, which results in a further de-charging of the emitter voltage $V_e$.

If during the next period the illumination of the phototransistor $T_f$ is equal to that in the period preceding the instant $t_o$, the current pulse which appears at the instant $t_7$ will yet be shorter than the current pulse which appeared at the instant $t_o$. This is because a part of the charge generated by this incident light compensates for the excess charge drain in the previous dark periods.

After a subsequent light period the current pulse which occurs at the instant $t_{10}$ will again have the correction duration.

The storage effect which is obtained in that during read out too much charge is drained from the base of the phototransistor $T_f$ can very simply be eliminated by injecting an equal amount of charge into the base. This might for example be effected by a weak continuous background illumination or by short flashes of light. A suitable leakage current or "dark current" may also have a compensating effect. However, these compensation measures cannot readily be applied with sufficient accuracy and, moreover, they occupy comparatively much space in the case of additional background illumination.

Figure 5:
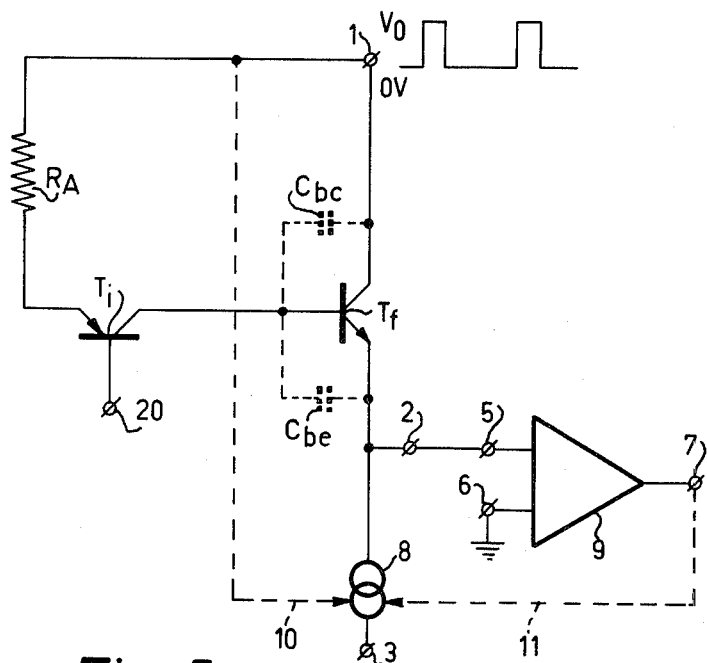
FIG. 5 shows a first form of a charge injection circuit in accordance with the invention.

A compensation method which is particularly suitable in the case of integrated circuits employs electronic injection means. FIG. 5 shows a first example of a device in accordance with FIG. 3, using electronic injection. Here the charge is injected in a pulsating fashion, which relative to continuous injection has the advantage that the injection current can be relatively large. This is because the amount of charge to be injected per sampling period is comparatively small, so that the required average injection current is very small.

The device of FIG. 5 is identical to that of FIG. 3 in respect of the read-out of the charge condition of the phototransistor $T_f$. For electronic injection a transistor $T_i$ has been added of a conductivity type opposite to the conductivity type of the phototransistor $T_f$. The collector of transistor $T_i$ is connected to the base of the phototransistor $T_f$, the base is connected to a point 20 at constant potential, which potential is higher than the maximum potential of the base of the phototransistor $T_f$, and the emitter is connected to the point 1, at which the sampling pulse appear, via a resistor $R_A$.

In the absence of a sampling pulse the transistor $T_i$ is reverse-biased. A sampling pulse provides a forward bias of the transistor $T_i$, so that a charge is injected into the base of the phototransistor $T_f$. The injection current which then flows is determined by the amplitude $V_o$ of the sampling pulse and the value of the resistor $R_A$.

If the resistor $R_A$ is connected to a point of constant voltage, higher than the threshold voltage of transistor $T_i$, instead of to point 1, injection is effected continuously. When the resistor $R_A$ is connected to point 20 and the sampling pulse is applied to the base of transistor $T_i$, injection is effected in the absence of a sampling pulse.

The injection method of FIG. 5 has the drawback that the resistance $R_A$ must be very high owing to the small injection current. This resistance $R_A$ may be of the order of magnitude of some tens of mega-ohms, which is a drawback, in particular in integrated circuits.

Figure 6:
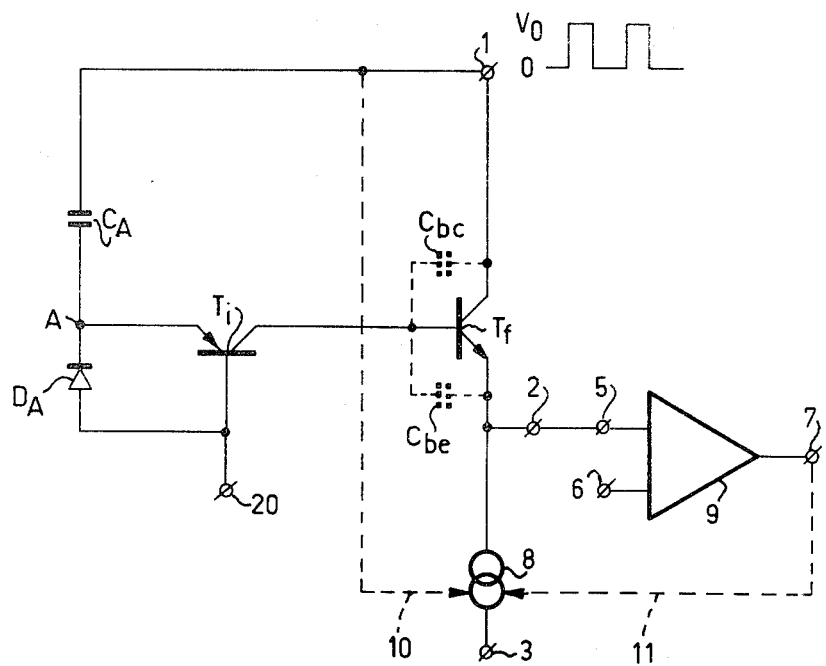
FIG. 6 shows a second form of a charge injection circuit in accordance with the invention.

FIG. 6 represents an injection method for which no resistor is required.

In the device of FIG. 6 the resistor $R_A$ of the device of FIG. 5 has been replaced by a capacitance $C_A$, which in integrated circuits is generally constituted by a reverse-biased semiconductor junction. The connection point A between the capacitance $C_A$ and the emitter of transistor $T_i$ is connected to the base of transistor $T_i$ via a semiconductor junction $D_A$, the forward direction of this semiconductor junction $D_A$ being opposite to the forward direction of the base-emitter junction of transistor $T_i$.

Figure 7:
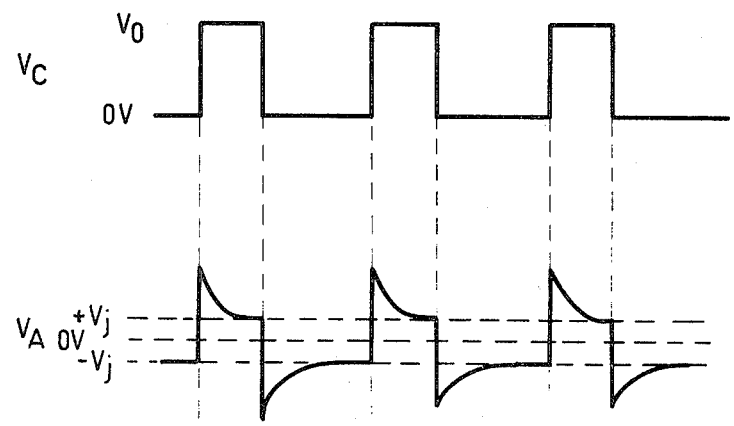
FIG. 7 shows some signal waveforms associated with the device of FIG. 6.

The operation of the injection circuit incorporated in the device of FIG. 6 will be described with reference to FIG. 7, in which $V_c$ is the voltage at the collector of the phototransistor $T_f$ and in which $V_a$ is the voltage at point A, $V_i$ being the threshold voltage of the transistor $T_i$, which is assumed to equal the threshold voltage of semiconductor junction $D_A$.

At the instant that a sampling pulse appears at point 1 $V_c$ becomes equal to $V_o$ volts, for example 5 V. The voltage $V_A$ will then initially increase by $V_o$ volts, after which it decreases again owing to the capacitance $C_A$ being charged. The base-emitter junction of transistor $T_i$ is then forward-biased, so that the charging current flows to the base of phototransistor $T_f$ via the emitter-collector path of transistor $T_i$. During this charging the voltage $V_A$ exponentially approximates to the voltage $V_i$, because below this voltage the transistor $T_i$ will no longer conduct. The semiconductor junction $D_A$ then remains cut off.

When the sampling voltage is switched off, the voltage $V_A$ decreases by $V_o$ volts. The base-emitter junction of transistor $T_i$ is then reverse-biased, whilst the semiconductor junction $D_A$ is forward-biased. The capacitance $C_A$ is discharged via the semiconductor junction $D_A$ and the voltage $V_A$ exponentially approximates to the voltage $-V_i$, the semiconductor junction $D_A$ being no longer conductive. The amount of charge injected per period is then determined by the value of the capacitance $C_A$ and the amplitude and pulse width of the sampling pulse.

In a similar way as in the device of FIG. 5 injection may also be effected in the absence of the sampling pulse. For this the sampling pulse is applied to the base of transistor $T_i$ and the capacitance $C_A$, is connected to point 20 instead of the point 1.

Figure 8:
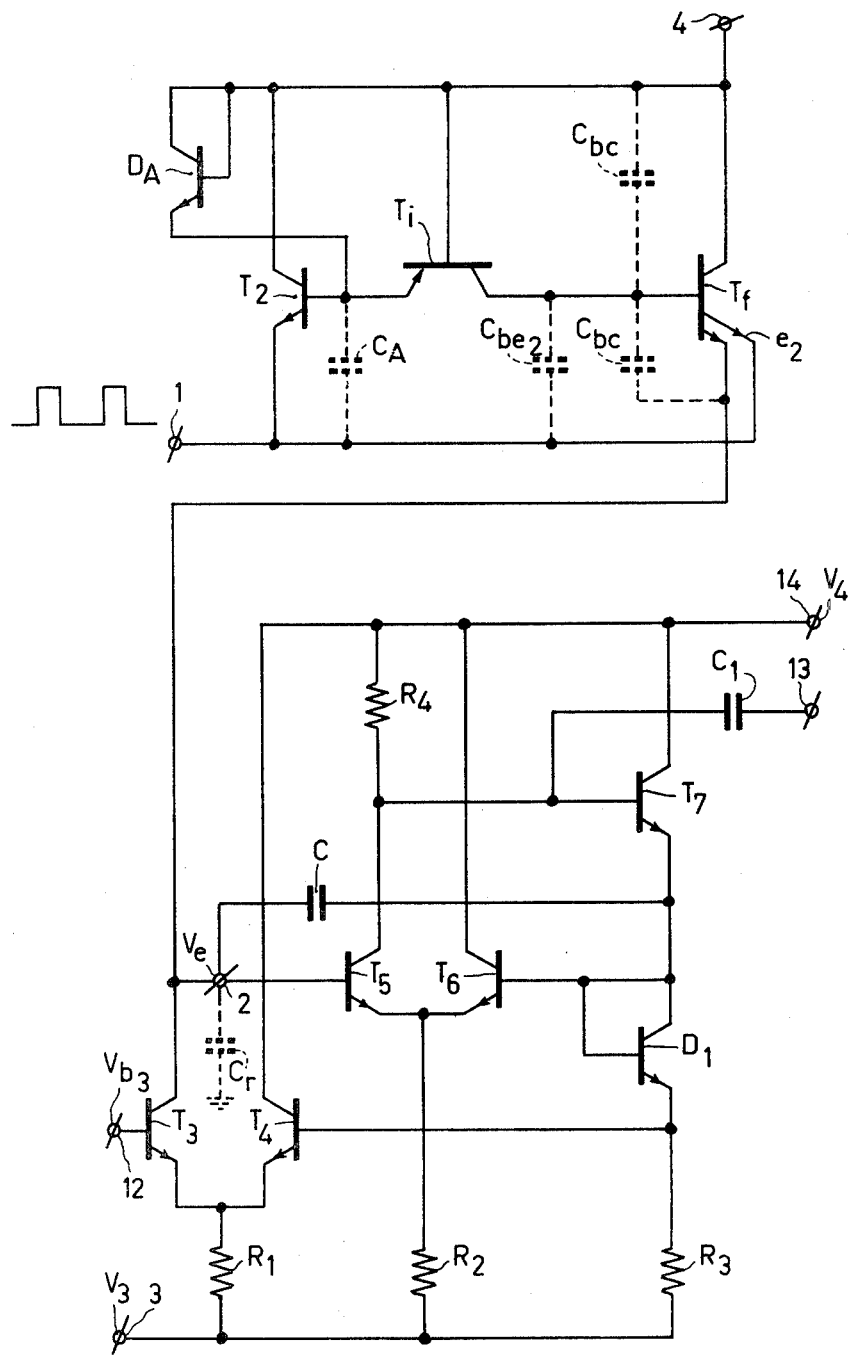
FIG. 8 shows a preferred form of a device in accordance with the invention.

In respect of the comparator circuit 9 and the switched current source 8, several embodiments are possible. FIG. 8 shows a preferred embodiment in which the switched current source 8 and the comparator circuit 9 are together constituted by a trigger circuit.

The device of FIG. 8 is based on a device in accordance with FIG. 2, in order to demonstrate that the steps according to the invention, described with reference to FIGS. 3 through 7, may also be applied to such a device. Moreover, the device of FIG. 2 is more suitable for application in a matrix of phototransistors, because in that case all collectors of the phototransistors can be formed by a common semiconductor layer, in which layer the base islands are formed with therein the two emitter regions. The control emitters $e_2$ of all phototransistors $T_f$ in a row are then mutually interconnected and so are the other emitters of all phototransistors $T_f$ in one column. When devices in accordance with FIG. 1 are used in a matrix the phototransistors $T_f$ could not take the form of vertical npn-transistors with the present integration techniques, unless all phototransistors $T_f$ in a column were isolated from each other by means of isolation diffusions, so that a larger area per phototransistor would be required.

In the device of FIG. 8 the current source 8 is constituted by a transistor $T_3$ of which the collector is connected to the emitter terminal 2, the base to a terminal 12, at which a constant voltage $V_{b3}$ is available, and the emitter to the emitter of the transistor $T_4$. The two emitters are connected to a supply terminal 3, at which a constant voltage $V_3$ is available, via a common resistor or current source $R_1$. The collector of transistor $T_4$ is connected to a supply terminal 14 at which a constant voltage $V_4$ is available. The emitter terminal 2, and thus the collector of transistor $T_3$ is connected to the base of a transistor $T_5$, of which the collector is connected to the supply terminal 14 via a resistor $R_4$, and of which the emitter is connected to the emitter of a transistor $T_6$ and via a resistor or current source $R_2$ to the supply terminal 3. The collector of transistor $T_6$ is connected to the supply terminal 14. The collector of transistor $T_5$ is connected to the base of a transistor $T_7$ and via a capacitor $C_1$ to a starting pulse input terminal 13. The collector of transistor $T_7$ is connected to the supply terminal 14. The emitter of transistor $T_7$ is connected to the base of transistor $T_6$, so that the collector of transistor $T_6$ is connected to the base of transistor $T_7$ via the base-emitter junction of transistor $T_7$. The base of transistor $T_5$ is connected to the base of transistor $T_4$ via a transistor $D_1$, which is connected as a diode, the base of transistor $T_4$ being connected to the supply terminal 3 via a resistor or current source $R_3$. The voltages $V_3$, $V_{b_3}$ and $V_4$ may for example be $-5$ V, $-1.9$ V and 0 V respectively.

When simultaneously with the appearance of a sampling pulse at terminal 1 a negative voltage pulse is applied to the starting input terminal 13 for starting the read-out process, this negative voltage pulse will appear at the base of transistor $T_6$ via the capacitor C and the base-emitter junction of transistor $T_7$ and subsequently via a diode $D_1$ at the base of transistor $T_4$. If this voltage pulse is sufficiently larger to initially produce a voltage lower than the voltage $V_{b_3}$ at the base of transistor $T_4$, transistor $T_4$ and transistor $T_6$ will be reverse-biased, whilst transistor $T_3$ and transistor $T_5$ will be forward-biased. The collector current of transistor $T_3$ is then determined by the voltages $V_{b_3}$ and $V_3$ and the value of the resistor $R_3$, so that transistor $T_3$ functions as a current source for the phototransistor $T_f$.

The collector current of transistor $T_5$ is determined by the collector voltage of transistor $T_3$, which voltage is the output voltage $V_e$ of the phototransistor $T_f$, and the resistor $R_2$. This collector current causes a voltage drop across the resistor $R_4$ which voltage drop keeps transistor $T_6$ reverse-biased via the base-emitter junction of transistor $T_7$ and subsequently the transistor $T_4$ via the diode $D_1$.

According as the phototransistor $T_f$ is further read out by the collector current of transistor $T_3$, the voltage $V_e$ further decreases until the voltage drop across the resistor $R_4$ causes the transistors $T_4$ and $T_6$ to be forward-biased. At that instant the state of the trigger changes and the transistors $T_3$ and $T_4$ are reverse-biased and remain in this condition until a new sampling pulse and, coincident therewith, a starting pulse restarts the read-out process.

In the device of FIG. 8 a phototransistor $T_f$ in accordance with FIG. 2 is employed. The second emitter $e_2$ is connected to point 1 to which the sampling pulses are applied. The collector of the phototransistor $T_f$ is connected to a supply terminal 4 at a constant voltage, for example $+5$ V. The base of the phototransistor $T_f$ is connected to the collector of the transistor $T_i$, of which the base is connected to the supply terminal 4 and via the semiconductor junction $D_A$, in the present example a transistor connected as a diode, to the emitter of transistor $T_i$, the forward direction of the semiconductor junction $D_A$ being opposed to the forward direction of the base-emitter junction of transistor $T_i$. The capacitance $C_A$ is constituted by the reverse-biased base-emitter junction of a transistor $T_2$.

In the absence of a sampling pulse at point 1 the capacitance $C_A$ will be charged via the semiconductor junction $D_A$. Upon the appearance of a sampling pulse the base-emitter junction of transistor $T_i$ is forward-biased, whilst the semiconductor junction $D_A$ is reverse-biased. The capacitance $C_A$ then discharges via the emitter-collector path of transistor $T_i$, so that injection takes place into the base of the phototransistor $T_f$.

In a similar way as in the injection circuit of FIG. 6 injection may be effected in the absence of the sampling pulse if the base of transistor $T_i$ is connected to point 1 and the side of the capacitance $C_A$ which in FIG. 8 is connected to point 1 to point 4.

As previously stated, the collectors of the phototransistors in a matrix of phototransistors $T_f$ will be constituted by a common semiconductor layer. A favourable injection method may then be used if the sampling pulses are sufficiently small, so that the injection circuit of FIG. 8 hardly responds thereto. Injection may then be effected by applying a negative voltage pulse to point 4 in the absence of the sampling pulse. It will be evident that a negative pulse at point 4 has the same result as the positive sampling pulse at point 1. During this negative pulse injection will take place in all phototransistors of the matrix.

An advantage of the last-mentioned injection method is that the amount of charge which is injected can be controlled at option, without the need of modifying the sampling pulse.

Figure 9:
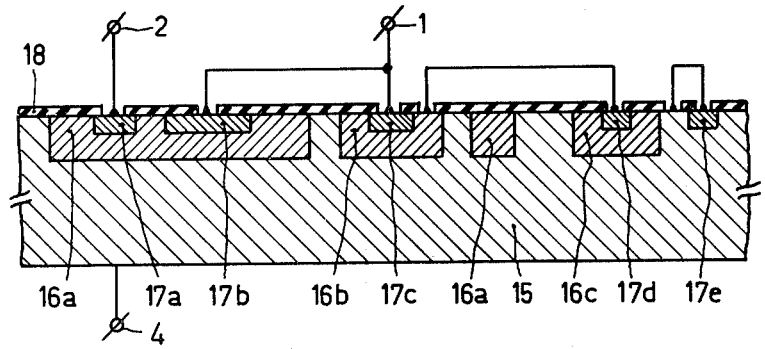
FIG. 9 shows the injection section of the device of FIG. 8 together with the phototransistor in integrated form.

FIG. 9 shows an injection circuit with phototransistors $T_f$ in accordance with FIG. 8, taking the form of an integrated circuit.

In an n-type substrate 15 p-type islands 16a, 16b and 16c are provided, the p-type island 16b being enclosed by the p-type island 16a. In the p-type island 16a the $n^+$-type regions 17a and 17b are formed, in the p-type island 16b the $n^+$-type region 17c, and in the p-type island 16c the $n^+$-type region 17d. In addition, the $n^+$-type island 17e is formed adjacent the p-type island 16c in the n-type layer 15. All this is covered by an isolating layer 18, in which recesses are formed for mounting the various contacts. The $n^+$-type region 17a is connected to the terminal 2, the $n^+$-type region 17b to the $n^+$-type region 17c and to the terminal 1. The p-type island 16b is connected to the $n^+$-type region 17d and the p-type island 16c is connected to the $n^+$-type region 17e. The substrate 15 is connected to the terminal 4.

The collector, base, emitter and second emitter $e_2$ of the phototransistor $T_f$ are constituted by the n-type substrate 15, the p-type island 16a, the $n^+$-type region 17a, and the $n^+$-type region 17b respectively. The emitter, base and collector of the injection transistor $T_i$ is constituted by the p-type island 16b, the n-type substrate 15, and the p-type island 16a respectively. The collector, base and emitter of transistor $T_2$ are constituted by the substrate 15, the p-type island 16b and the $n^+$-type region 17c respectively, the capacitance $C_A$ being constituted by the capacitance of the cut-off boundary layer between the $n^+$-type region 17c and the p-type island 16b. The collector, base and emitter of the transistor $D_A$, which is connected as a diode, are constituted by the $n^+$-type region 17d, the p-type region 16c and the $n^+$-type region 17e respectively.

Figure 10:
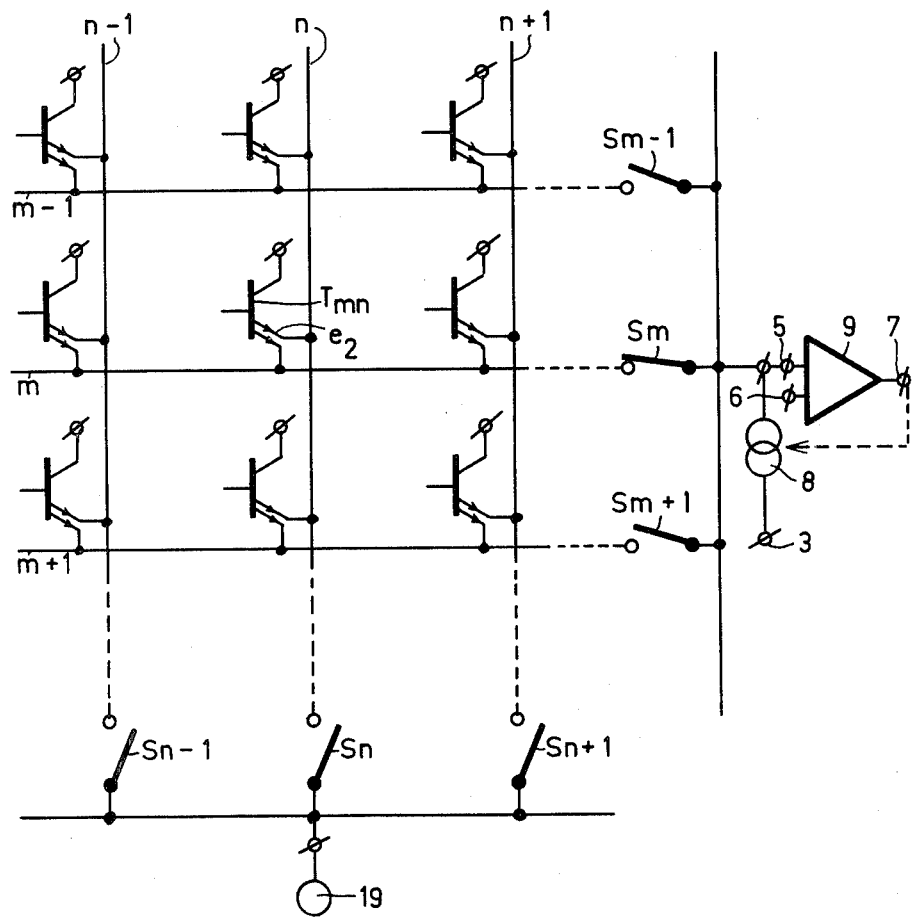
FIG. 10 shows a matrix of phototransistors.

FIG. 10 shows the arrangement of phototransistors in a matrix, subdivided into rows and columns. The Figure shows three rows and three columns. The emitters of all phototransistors in a row are connected to a line, in the Figure the rows $m-1$, $m$ and $m+1$. The second emitters $e_2$ of all phototransistors in a column are connected to a line, in the Figure the columns $n-1$, $n$, and $n+1$. The rows $m-1$, $m$ and $m+1$ are connected to the switchable current source 8 via switches $S_{m-1}$, $S_m$ and $S_{m+1}$, which source is controlled by the comparator circuit 9. The columns $n-1$, $n$ and $n+1$ are connected to a source of sampling pulses 19 via switches $S_{n-1}$, $S_n$ and $S_{n+1}$. The various switches S will generally be logic gate circuits.

In FIG. 10 the switches $S_n$ and $S_m$ are closed, so that the charge condition of transistor $T_{mn}$ can be read out. Thus, an entire matrix of phototransistors can be read out.

The bases of the phototransistors may each be connected to an injection circuit. If for each phototransistor with injection circuit the integrated circuit of FIG. 9 is employed, the collectors of all phototransistors in the matrix are constituted by the common substrate 19. All points 2 of all phototransistors in a row are mutually connected by a conductor track and so are all points 1 of all phototransistors in a column.

As previously stated, the sum of the base-emitter capacitances $C_{be}$ of all other phototransistors of the selected row is available in parallel with the current source I in a matrix of phototransistors. As a result, the phototransistor $T_{mn}$ is further discharged for some time after the current source has been switched off, until owing to said row capacitance $C_r$ being charged, which capacitance is the said sum of the base-emitter capacitances, the base-emitter junction of the phototransistor $T_{mn}$ is reverse-biased. As previously stated, a first solution is to amplify the emitter current of the phototransistor $T_{mn}$, for example with an additional transistor, so that the collector-base capacitance $C_{bc}$ of the phototransistor $T_{mn}$ is apparently increased by the current gain factor of said additional transistor. The second solution is to apply a voltage pulse to the emitter of the phototransistor $T_{mn}$ at the instant that the current source I is switched off, so that the base-emitter junction of the phototransistor $T_{mn}$ is reverse-biased at the instant that the current source I is switched off.

In the example of FIG. 8 this last-mentioned solution is represented. The row capacitance $C_r$ in this Figure, shown dotted, is connected to the emitter terminal 2. A capacitance C connects said terminal 2 to the emitter of transistor $T_7$. At the instant that the current source is switched off, transistor $T_5$ becomes currentless and a voltage transient is produced across the resistor $R_4$. This voltage transient is also present at the emitter of transistor $T_7$ and is distributed between the capacitances C and $C_r$, so that a part thereof appears at the emitter of the phototransistor $T_f$. The voltage transient at the emitter of the phototransistor $T_f$ is then determined by the ratio of the capacitances C and $C_r$ and the amplitude of the voltage transient across the resistor $R_4$. If for example the capacitance C equals the capacitance $C_r$, the resistor $R_4$ equals 100 ohms and the collector current of transistor $T_5$ equals 10 mA before the current source I is switched off, the voltage transient at the emitter of the phototransistor $T_f$ will equal 0.5 V, which is sufficient to cut off the base-emitter junction of the phototransistor $T_f$.

It is obvious that the invention is neither limited to the examples shown, nor to the transistor types shown therein. For example, for the injection transistor $T_i$ it is alternatively possible to use transistors of the insulated-gate type.

What is claimed is:

1. A device for reading out the charge condition of a phototransistor by means of sampling pulses, the voltage at the emitter of said phototransistor being a measure of said charge condition, comprising means for applying sampling pulses to said phototransistor, a current source coupled to the emitter circuit of said transistor, said current source being switched on at the instant of sampling, a voltage comparator circuit, and means applying the emitter voltage of said phototransistor to said voltage comparator circuit for providing a voltage for switching off said current source at the instant that said emitter voltage drops below a prescribed reference value, thereby enabling the phototransistor to be fully discharged by each said sampling pulse.

2. A device as claimed in claim 1, wherein the charge drained from said phototransistor by the current source in the case of sampling during a dark period of the phototransistor is compensated for by charge injection means in the base of the phototransistor.

3. A device as claimed in claim 2, wherein said charge-injection means comprise a field effect transistor, which transistor is of a conductivity type opposite to the conductivity type of said phototransistor, said transistor drain electrode being connected to the base electrode of said phototransistor, and means applying an injection-controlling voltage between the control electrode and the source electrode of said transistor.

4. A device as claimed in claim 3, wherein said means applying an injection-controlling voltage includes a semicondutor junction connected in series with a capacitive element between two points, means applying a pulsating voltage between said two points, said drain electrode of said transistor being connected to the connection point between said capacitive element and one side of said semiconductor junction, said control electrode being connected to the other side of said semiconductor junction, the forward direction of said semiconductor junction being opposite to the forward direction of said control-electrode - source-electrode junction of said transistor.

5. A device as claimed in claim 4, wherein one point of the said two points is connected to a point of constant potential and the other point is connected to said means for supplying sampling pulses.

6. A device as claimed in claim 1, further comprising a matrix of phototransistors, the charge condition of any one of the phototransistors of the matrix being sampled by a selection means, the current source and the voltage comparator circuit being in common for all phototransistors in a row of said matrix.

7. The device as claimed in claim 4, further comprising a matrix of phototransistors, said sampling pulses being applied to a second emitter of each phototransistor, the second emitters in each column of the matrix being commonly connected to a column selection means and to the emitters in each row of the matrix, said output voltage being taken from said emitters, the first emitters of each phototransistor being connected to a row selection means by a common connection line, and wherein the collectors of all phototransistors of the matrix are constituted by a common semiconductor layer, the control electrodes of each transistor being connected to the collectors of the phototransistors, said pulsating voltage between said points being voltage pulses which, in the absence of sampling pulses, are applied to said semiconductor layer.

8. A device as claimed in claim 1, wherein said current source and said voltage comparator circuit are constituted by a bistable trigger circuit with a set input, a reset input and a current output, the current output being connected to the emitter of the phototransistor, starting pulses being applied to the set input in synchronism with said sampling pulses, and the reset input being connected to the emitter of the phototransistor.

9. A device as claimed in claim 6, wherein means are provided for supplying a voltage pulse to the emitter of a selected phototransistor when said current source is switched off.

10. A device as claimed in claim 6, wherein to each phototransistor a transistor of the same conductivity type is added, of which transistor the base is connected to the emitter of the phototransistor, the current source being included in the emitter circuit of the additional transistor.

* * * * *